(12) United States Patent
Pannell

(10) Patent No.: US 8,724,209 B2
(45) Date of Patent: May 13, 2014

(54) ACOUSTO-OPTIC DEVICE WITH ELECTRODE HAVING DIFFERENT TRANSVERSE EDGE POSITIONS

(75) Inventor: Christopher N. Pannell, Orlando, FL (US)

(73) Assignee: Gooch and Housego PLC, Somerset (GB)

( * ) Notice: Subject to any disclaimer, the term of this patent is extended or adjusted under 35 U.S.C. 154(b) by 309 days.

(21) Appl. No.: 13/325,777

(22) Filed: Dec. 14, 2011

(65) Prior Publication Data
US 2013/0155485 A1    Jun. 20, 2013

(51) Int. Cl.
*G02F 1/11* (2006.01)
*G02F 1/33* (2006.01)

(52) U.S. Cl.
USPC ........... 359/285; 359/286; 359/287; 359/305; 359/308; 359/309; 359/310; 359/311; 359/312; 359/313; 359/314

(58) Field of Classification Search
USPC .................................. 359/285–287, 305–314
See application file for complete search history.

(56) References Cited

U.S. PATENT DOCUMENTS

| | | | |
|---|---|---|---|
| 6,307,665 B1 * | 10/2001 | Kim et al. .................... | 359/287 |
| 7,283,290 B1 | 10/2007 | Pannell et al. | |
| 7,863,800 B2 | 1/2011 | Bergmann et al. | |
| 2010/0271910 A1 | 10/2010 | Boutaghou | |

* cited by examiner

*Primary Examiner* — Evelyn A. Lester
(74) *Attorney, Agent, or Firm* — Jetter & Associates, P.A.

(57) ABSTRACT

An acousto-optic (AO) device includes an AO interaction crystal for receiving and propagating a light ray along an optical propagation direction (OPD). A piezoelectric transducer is on at least one surface of the AO interaction crystal for receiving an electrical signal and emitting an acoustic wave into the AO interaction crystal. An electrode is on the piezoelectric transducer for coupling the electrical signal to the piezoelectric transducer. The electrode is a patterned electrode that includes a plurality of different transverse edge positions. The plurality of different transverse edge positions span a position range of at least five percent of an average height ($H_{avg}$) of the electrode.

14 Claims, 7 Drawing Sheets

ACOUSTO-OPTIC DEVICE WITH ELECTRODE HAVING DIFFERENT TRANSVERSE EDGE POSITIONS

FIELD

Disclosed embodiments relate to acousto-optic devices having patterned electrodes.

BACKGROUND

Devices in which an acoustic beam and an optical beam interact are generally referred to as "acousto-optic devices", or simply "AO devices". In commercially available AO devices, the acousto-optic interaction occurs within the near field of the acoustic transducer. This is because the near field of the acoustic transducer is normally regarded as extending in a direction normal to the transducer surface for a distance of approximately one Rayleigh range ($R_L$), which is given by the following equation:

$$R_L = \frac{(\text{characteristic length})^2}{\Lambda} \quad (1)$$

where the "characteristic length" is a length associated with some transverse dimension of the transducer, and $\Lambda$ is the acoustic wavelength.

If the transducer electrode is rectangular (or has a pattern whose natural boundary is a rectangle), as is generally the case, there are in fact two characteristic lengths, conventionally taken as the transducer length (L) that by convention is in the optical propagation direction (OPD) of the beam in the AO crystal and the height (H) which is conventionally taken to be the direction transverse to the OPD referred to as the transverse direction. In this case the extent of the acoustic near field in the AO crystal is the minimum of the two Rayleigh ranges, found from equation (1) above using H and L as respective characteristic lengths.

As an example, consider a typical acousto-optic tunable filter (AOTF) having an electrode in the form of a rectangle of metal having L=20 mm and H=10 mm on a piezoelectric transducer. If the operating acoustic wavelength is 10 μms, the two Rayleigh ranges would be 40 meters (associated with L) and 10 meters (associated with H), respectively. In either case, since AO devices are known to be limited by available AO interaction crystal sizes to a few cms in size, device operation is always deep in the near field region. This situation is in stark contrast to other fields of acoustics, in sonar for example, where operation is nearly always in the far field region.

FIG. 1A represents a known AO device 100 comprising a conventional rectangular metallic top electrode 110 (generally referred to hereafter as "electrode" 110) over a piezoelectric (acoustic) transducer 115 having an AO interaction crystal 120 under the piezoelectric transducer 115 for receiving and propagating a light ray along the optical propagation direction (OPD) shown. Points A and B correspond to the left and right vertical side walls of the top electrode 110, that are parallel to the OPD. The acoustic field provided by the piezoelectric transducer 115 is assumed to be radiating in the direction perpendicular to the plane of the electrode 110 and that of FIG. 1A (i.e., radiating into the page). The OPD for the light ray received through the center of the aperture of this AO interaction crystal 120 propagates in the direction shown by the arrow (below the plane of the electrode 110).

FIG. 1B is simulated data that shows the effect of averaging the acoustic field along the OPD, row by row, for the known AO device 100 having the conventional rectangular electrode 110 represented in FIG. 1A. The relative average acoustic intensity is shown as a function of position in the transverse direction (transverse position) between points A and B. The center of the electrode 110 in the transverse (H) direction is shown as C in FIG. 1B.

The acoustic transducer was simulated as being 0.5 mm (L)×0.5 mm (H) in size (area), and the acoustic wavelength was set at 10 microns. The Rayleigh-Sommerfeld diffraction integral was used with no approximations (e.g., no assumption that the Fresnel approximation is valid) to calculate the acoustic field produced by the acoustic transducer, implemented as a numerical routine. The distance from the transducer 115 into the AO crystal 120 used in the simulation was approximately 0.5× H H, i.e. 0.25 mm.

It is noted that the electrode 110 defines the part of the acoustic transducer which produces acoustic waves, so for practical purposes it is often referred to as "the transducer". However, for practical reasons in manufacturing, and as shown in FIG. 1A, the transducer 115 is usually larger in area as compared to the electrode 110.

It is noted that the integrated acoustic effect is not the same as the averaged effect. However, the averaged acoustic effect is used here for illustration as it is similar, and an AO device constructed according to the constraint of homogenizing the integrated acoustic effect will for practical purposes, be equivalent to one constructed by constraining the average acoustic field experienced by a photon as it passes along the OPD shown in FIG. 1A.

FIG. 1B shows significant variation in the length-averaged relative acoustic intensity along the transverse direction generated by known AO device 100 comprising a conventional rectangular electrode 110. For example, the peak-to-peak length-averaged variation in average acoustic intensity in the AO crystal 120 below a midway position between C of the electrode 110 and its edges (A, B) and transverse positions proximate thereto (defined herein a transverse position range of ±5 percent of H) can be seen to be at least about 20 percent of the value of the acoustic intensity at C (shown equal to 0.8).

The near acoustic field region generated by the transducer 115 acting as an acoustic radiation source thus possesses the characteristic of being very inhomogeneous as a function of transverse position, such as compared to its far field, a fact that often not considered in the design and operation of AO devices such AOTFs. This means that the acoustic intensities present in the acoustic near field region vary significantly from one transverse position to another. As a result, a ray propagating in the AO crystal 120 laterally from under the center (the center is shown as C in FIG. 1B) of the electrode 110 in the transverse direction may experience a highly non-uniform acoustic field in the AO crystal so that the acoustic field intensity may be up to 30% or more higher or lower as compared to the acoustic field intensity under locations at or near C.

SUMMARY

Disclosed embodiments recognize the performance of AO devices can benefit from improving the length-averaged uniformity of the near field acoustic intensity as a function of the transverse position under the transducer, which as shown in FIG. 1B described above for conventional rectangular electrode designs can be highly non-uniform away from C. Such embodiments recognize that in the case of AO-based imaging, such as AOTF-based imagers, the desired image generated is essentially modulated by a map of the diffraction efficiency, and the diffraction efficiency is in turn directly related to the local acoustic intensity, which due to non-uniformities in the near field acoustical field in the transverse direction across the area of the AOTF for conventional electrode designs such as described above in FIG. 1B, results in artifacts appearing superimposed on the image.

This artifact effect is particularly noticeable in the case of a telecentric-confocal arrangement for a hyperspectral imager employing an AOTF, because an intermediate focus is formed in or near to the AOTF. The telecentric-confocal arrangement is commonly used to reduce acousto-optic blur and although generally successful in this regard, the telecentric-confocal arrangement introduces pronounced artifacts superimposed on the image generated as an unwanted side-effect (See FIG. 6A described below). Disclosed embodiments can reduce the appearance of such artifacts (See FIG. 6B described below). Disclosed embodiments can also benefit non-image forming AO devices that operate in the near field which may benefit from an averaged acoustic intensity along the interaction length of the AO device that is essentially independent of the ray path in the transverse direction through the AO device, such as AO Beam Deflectors (AOBDs).

Disclosed patterned electrodes include a plurality of different transverse edge positions, where the plurality of different transverse edge positions span a position range of at least five percent of an average height ($H_{avg}$) of the electrode. Disclosed patterned electrodes have been found to provide an average acoustic intensity along the interaction length of the AO device that is essentially independent of the path in the transverse direction taken by a light ray through the AO device. Accordingly, by providing disclosed patterned electrodes including a plurality of different transverse edge positions, disclosed embodiments can solve the image blurring problem for image forming AO devices such as AOTFs, and can solve problems for non-imaging devices such as AOBDs as well. As used herein, "transverse" is defined to mean in a direction that is within 10 degrees of transverse (normal) to the optical propagation direction (OPD) on the plane of the electrode, and in another embodiment within 5 degrees of being transverse to the OPD.

Disclosed embodiments include AO devices comprising an AO interaction crystal for receiving and propagating a light ray along an OPD, a piezoelectric transducer on at least one surface of the AO crystal, and a disclosed patterned electrode on the piezoelectric transducer for coupling an electrical signal to the piezoelectric transducer. The patterned electrode includes a plurality of different transverse edge positions, where the plurality of different transverse edge positions span a position range of at least five percent of $H_{avg}$. In some embodiments, the plurality of different transverse edge positions span a position range from five to twenty five percent of $H_{avg}$.

The transverse edge positions can follow a linear or a non-linear function based on a variety of different mathematical functions, including non-deterministic (random) functions or deterministic functions. The functions can be smooth, or discontinuous. Deterministic functions are known to always return the same result any time they are called with a specific set of input values and given the same state of the database, such as sine or cosine functions. Non-deterministic functions may return different equivalently useful electrode pattern results each time they are called with a specific set of input values even if the database state that they access remains the same.

Disclosed embodiments can use a random number generator in the electrode shaping program, such as in one particular embodiment to introduce the random shuffling of the transverse "elementary rectangles". Once a random pattern is selected, that electrode pattern can be used to make up the electrode photolithographic mask. The selection process may ignore patterns with big spaces in the longitudinal (OPD) metal finger distribution, as these candidates have been found to not perform as well as patterns with relatively small spaces in the longitudinal metal finger distribution.

Disclosed embodiments are distinguishable from related work by the same Inventor reflected in U.S. Pat. No. 7,283,290 to Pannell et al. entitled "Acousto-optic devices having highly apodized acoustic fields and methods of forming the same" (the '290 patent) in both patterned electrode structure and function. In the '290 patent patterned electrodes are disclosed that include a continuous region proximate to its center and a discontinuous region, where the pattern is oriented in the OPD, with the pattern in the discontinuous region including a plurality of spaced apart features electrically connected to the continuous region. The feature size of the features in the pattern are sufficiently small to provide a fine structure far field condition for the acoustic wave in the AO interaction crystal underlying the discontinuous region beginning <5 mm measured from an interface between the piezoelectric crystal and the AO interaction crystal. The patterned electrodes disclosed in '290 significantly enhances suppression of out-of-band light by removing side lobes which improves spectral purity.

The discontinuous electrode regions in the '290 patent are always disclosed to be along the OPD (in the L dimension), with the edges in the H dimension for the patterned electrode being constant (vertical edges). This is in contrast to disclosed patterned electrodes that have a plurality of different transverse edge positions that are oriented transverse to the direction to the OPD which provides edges in the H dimension that vary as a function of L. However, as described below, disclosed electrode patterns can optionally be combined with the electrode patterning disclosed in the '290 patent (see FIG. 4 described below).

DETAILED DESCRIPTION

Figure 1A:
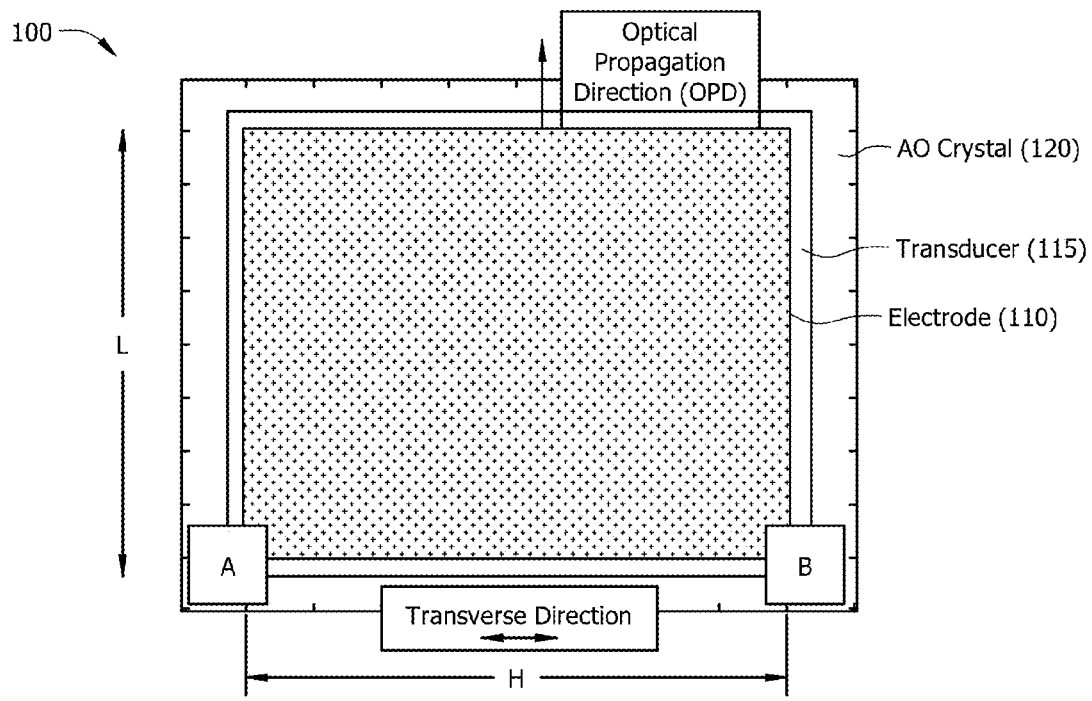
FIG. 1A represents a known AO device comprising a conventional rectangular metallic top electrode over a piezoelectric transducer having an AO interaction crystal under the piezoelectric transducer for receiving and propagating a light ray.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Disclosed embodiments provide patterned electrodes that include a plurality of different transverse edge positions for AO devices that improve the uniformity of the intensity of the acoustic waves in the near field in the AO crystal in the transverse direction, essentially without the diffractive effects leading to the modulation of the near field. As used herein, the "near-field" is within one Rayleigh range ($R_L$; from equation 1 above) in the AO crystal measured from the acoustic transducer which it is bonded to. Typically, such a crystal would have characteristic dimensions of a few cms, and the acoustic transducer would have characteristic dimensions of a few mm to a few cm.

For example, an example AOTF may use an acoustic transducer whose electrode can be described as a rectangle 22 mm in L by 12 mm in H. The optical aperture of this device may be 12 mm×12 mm with the "long" axis (the L dimension) of the rectangle being aligned with the OPD. As noted above, making the near acoustic field uniform in the transverse direction is not possible with known transducer top electrode designs currently available. For an AO device such as the AOTF it is sufficient to make the integrated AO effect uniform in the transverse direction.

Figure 2A:
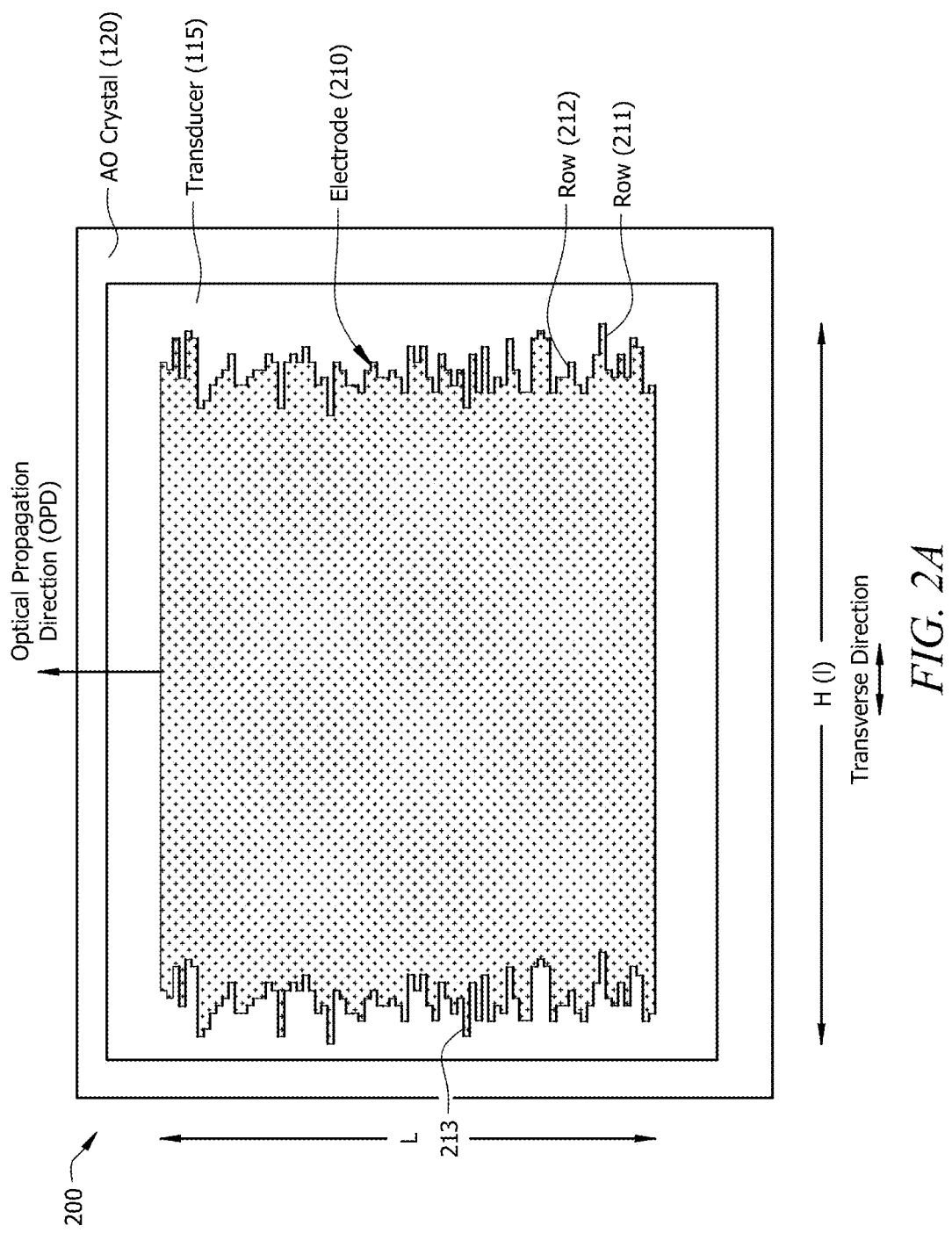
FIG. 2A represents an AO device comprising an example patterned electrode that includes a plurality of different transverse edge positions over a piezoelectric transducer having an AO interaction crystal under the piezoelectric transducer for receiving and propagating a light ray, according to an example embodiment.

FIG. 2A represents an example AO device 200 comprising a disclosed metallic top electrode 210 that includes a plurality of different transverse edge positions over a piezoelectric transducer 115 having an AO interaction crystal 120 under the piezoelectric transducer for receiving and propagating a light ray, according to an example embodiment. AO device 200 can comprise an Acousto-Optic Modulator (AOM), AO Beam Deflector (AOBD), Bragg Cell (BC), AOTF, AO Frequency Shifter (AOFS) or an AO Correlator (AOC). Typically, the transducer 115 can comprise a single crystal of lithium niobate (LN) and the AO interaction crystal 120 comprise $TeO_2$. However, disclosed embodiments are not limited to any particular materials.

Disclosed embodiments include methods of fabricating a patterned electrode for coupling to a piezoelectric transducer of an AO device. The method can comprise designing an electrode pattern for the electrode that includes a plurality of different transverse edge positions, where the plurality of different transverse edge positions span a position range of at least five percent of an average height ($H_{avg}$) of the electrode. The electrode pattern can be formed on a face of the piezoelectric transducer using a process comprising lithography, such as photolithography.

One method of designing a disclosed patterned electrode such as top electrode 210 is beginning with an initial rectangular electrode pattern having an initial rectangular outline (such as electrode 110 shown in FIG. 1A), and dividing the rectangular outline into a plurality of smaller rectangles. The plurality of smaller rectangles are then displaced in the transverse direction with respect to one another to provide a plurality of different transverse edge positions.

The different transverse edge positions can comprise an electrode pattern that is based on a non-deterministic (random) function, such as where n is a Gaussian random variable or a uniformly distributed variable. However, Gaussian and uniform are just two possible example of an infinite number of possible random distribution functions. The random distribution function is applied to the rows of the top electrode 210 with rows 211, 212 and 213 that are oriented in the transverse direction shown in FIG. 2A. As shown, each of the large number of rectangular rows (r) of the electrode 210 shown is shuffled n(r) places to either the right or to the left, with n(r) being random numbered derived from Gaussian random variable. Alternatively, although not shown, n(r) can be generated from numbers obtained from a deterministic function.

Although the respective rows shown are all of a constant end-to-end dimension in the transverse direction, disclosed embodiments are not limited to constant end-to-end dimensions in the transverse direction. The dimension of the rows in the L/OPD direction is on a scale shown in FIG. 2A that is generally smaller than the acoustic wavelength, such as <10 μm for an acoustic wavelength of 10 μm. However, the dimension of the rows in the L/OPD direction can be larger than the acoustic wavelength, such as in a range of >1 to 20 acoustic wavelengths. Such an electrode pattern can be printed on a transducer substrate such as a LN using conventional photolithography, which can also be used to implement irregular features, such as curved or angled features.

Figure 1B:
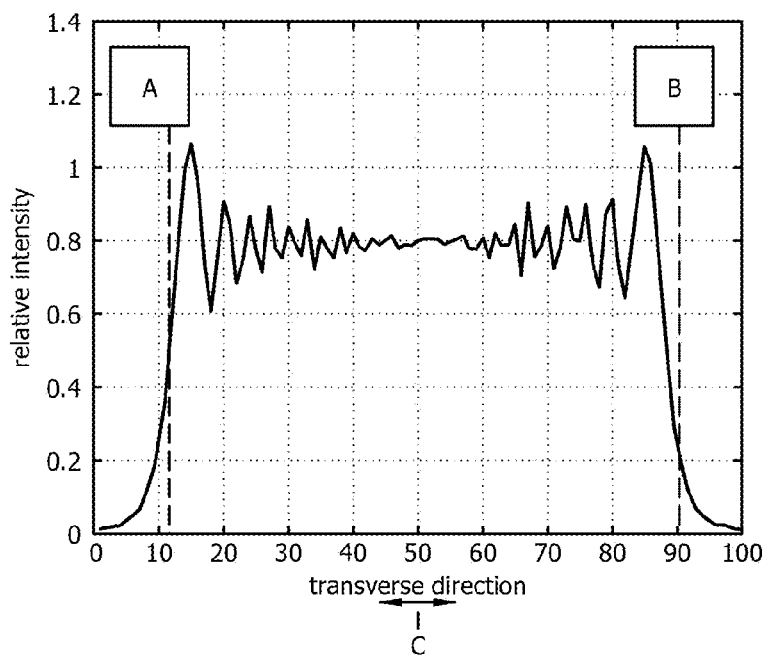
FIG. 1B is simulated data that shows the effect of averaging the acoustic field along the optical propagation direction (OPD), row by row, for the known AO device having a conventional rectangular metallic top electrode represented in FIG. 1A.
Figure 2B:
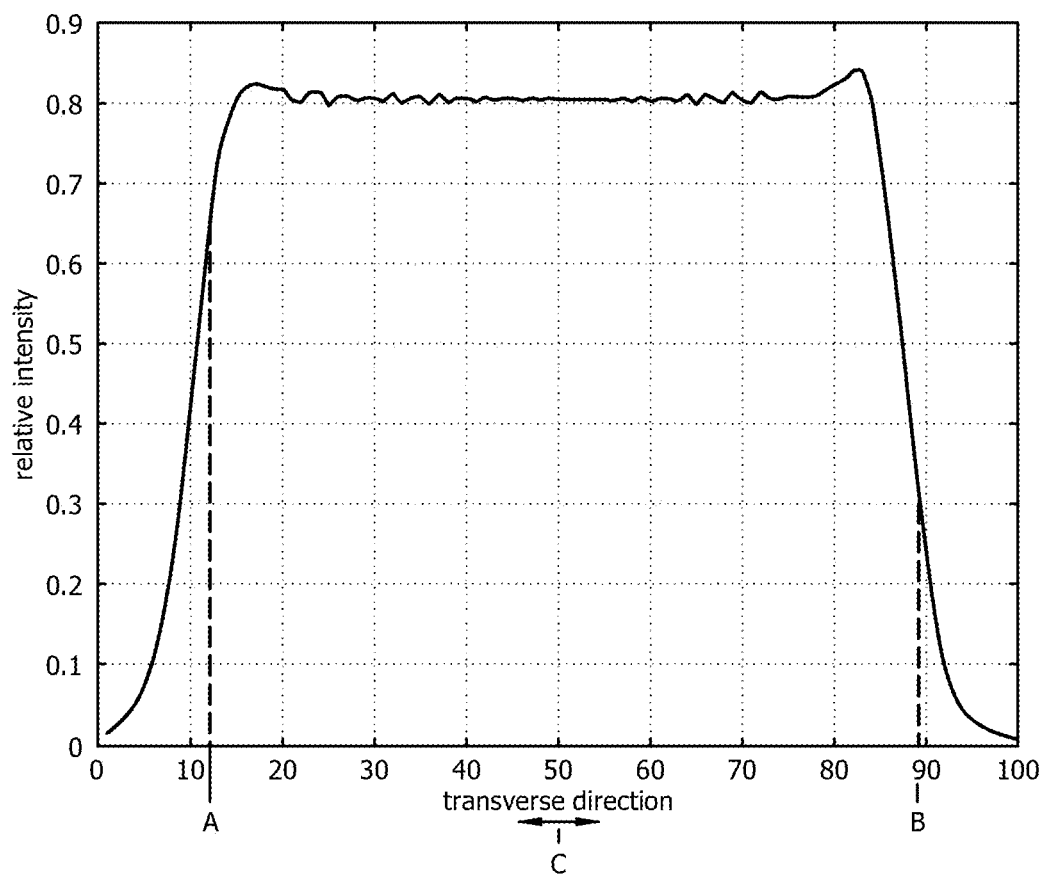
FIG. 2B is simulated data that shows the simulated acoustic intensity, averaged column by column, for the acoustic field produced by the patterned top electrode shown in FIG. 2A, according to an example embodiment.

FIG. 2B is simulated data that shows the acoustic intensity averaged along the OPD for AO device 200 represented in FIG. 2A, i.e. column by column. Since the end-to-end dimension in the transverse direction of the electrode 210 is variable due to different transverse edge positions along the L of the electrode 210, H is shown as a function of 1, i.e. H(1). For the simulation performed the acoustic transducer was 0.5 mm in L×0.5 mm in average H (to provide an area comparable in size to electrode 110 described relative to FIG. 1B), the acoustic wavelength was again set at 10 μm, and the Rayleigh-Sommerfeld diffraction integral was again used with no approximations to calculate the acoustic field produced by acoustic transducer 115, implemented as a numerical routine.

It can be seen that the length-averaged acoustic intensity much more uniform as the transverse position is varied as compared to the length-averaged acoustic intensity variation with transverse position shown in FIG. 1B. For example, the peak-to-peak variation in line-average acoustic intensity at a midway position between C of the electrode 210 and its edges (A, B) and transverse positions proximate thereto (defined herein a transverse position range of ±5 percent of H) can be seen to be less than 5 percent of the value of the acoustic intensity at C (equal to 0.8). Compared to the performance of the conventional (rectangular reference) electrode 110 shown in FIG. 1B, electrode 210 can be seen to provide a reduction in length-averaged peak-to-peak variation of line-averaged relative acoustic intensity at, and proximate to, the midway position (C) by over 75 percent. More generally, the reduction in length-averaged variation of line averaged relative acoustic intensity at and proximate to the midway position (C) is at least 50 percent.

The distance from the transducer 115 on the AO crystal 120 used in this simulation was approximately 0.5H, i.e. 0.25 mm, same as for FIG. 1B. It is noted that the acoustic intensity patterns are similar for a range of distances, so a single patterned electrode having a plurality of different transverse edge positions can produce a significantly enhanced uniformity of the length-integrated acoustic intensity in the transverse direction to the averaged acoustic intensity for a variety of distances from the transducer, from essentially a distance of zero (at the transducer surface) out to a distance of at least about 1× or 2× H. In practice, for AOTF applications, disclosed patterned electrodes have been found to allow the line-averaged acoustic intensity within the full AOTF aperture area to be substantially homogenized.

As disclosed above, the form of the function to generate a plurality of different transverse edge positions can be set by a variety of mathematical functions. If the random numbers n(r) are taken from a normal distribution or other uniform distribution, similar results are obtained. Other probability distributions are expected to give similar results.

The maximum absolute value which the number (n) that sets the transverse edge positions is allowed to reach may also be used in the electrode pattern design. If the maximum value is too small, such as <one percent of Havg of the electrode, little improvement in acoustic intensity uniformity in the transverse direction may result, except for very close to the transducer. If the maximum value is too large, such as greater than 30 percent, then the peak-peak H of the transducer is increased needlessly, necessitating larger transducers and AO interaction crystals, which increases cost and electrical power consumption.

Figure 3A:
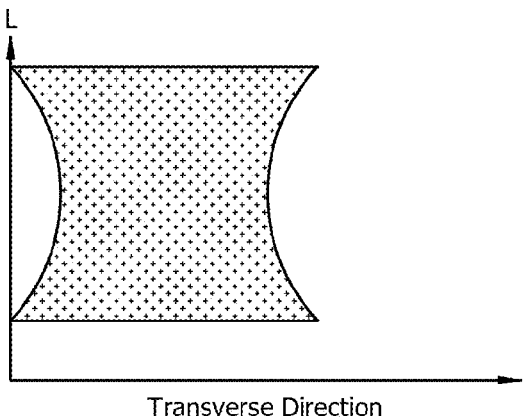
FIGS. 3A-D depict some example patterned electrodes, according to disclosed embodiments.
Figure 3B:
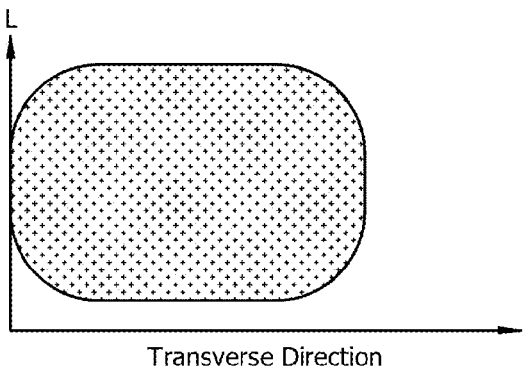
Figure 3C:
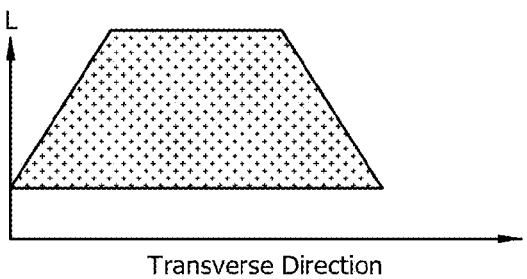
Figure 3D:
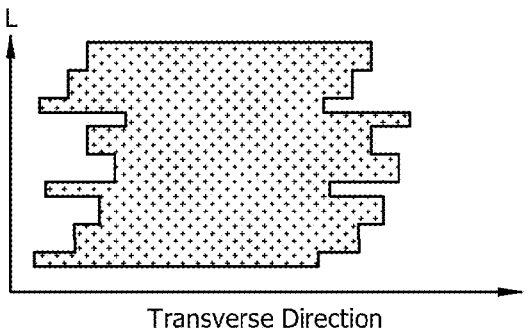

FIGS. 3A-D depict example patterned electrodes, according to disclosed embodiments. FIGS. 3A, 3B and 3D depict example electrodes having transverse edge positions defined by non-linear functions. FIG. 3C depicts an example electrode having transverse edge positions defined by a linear function.

Figure 4:
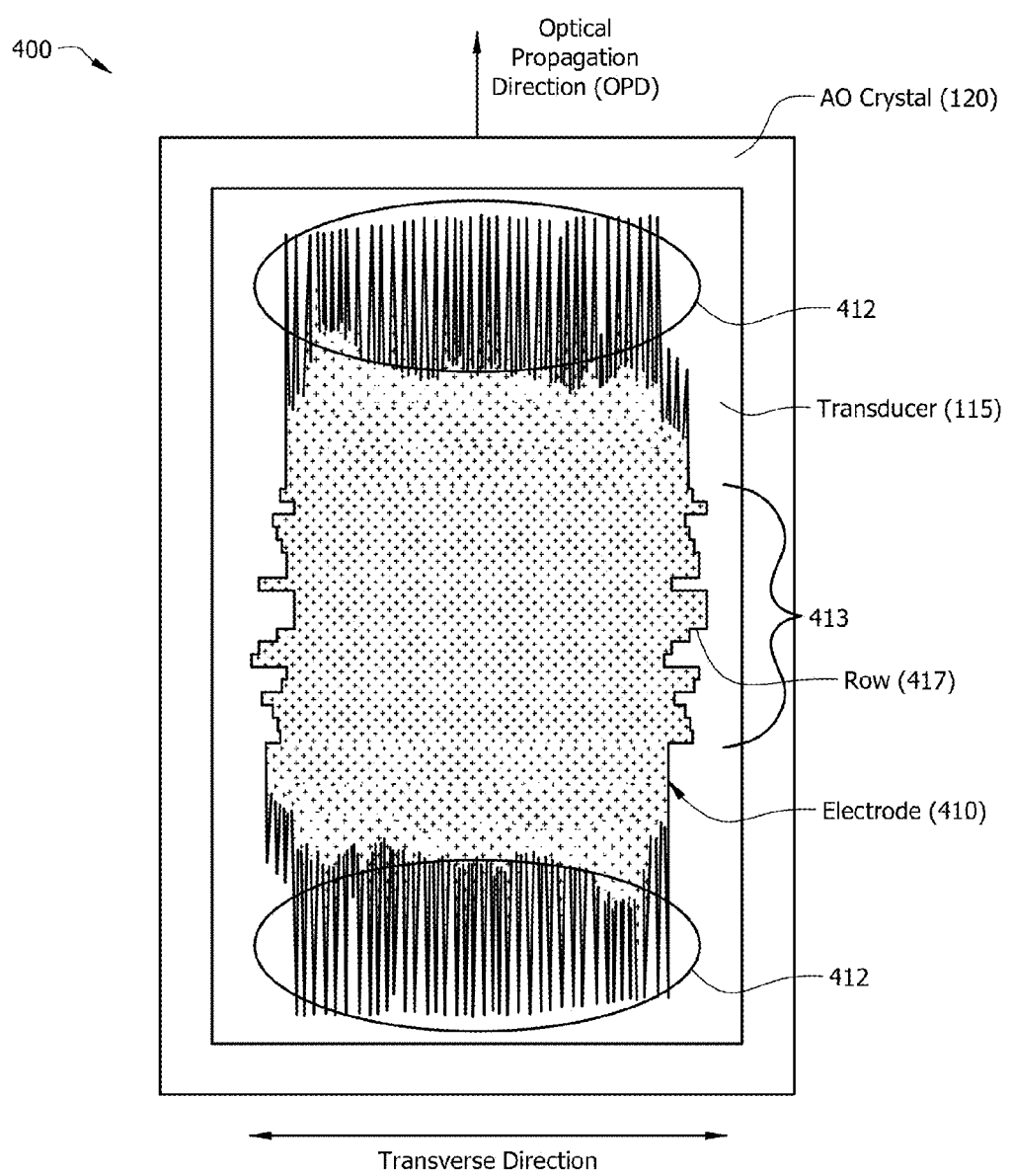
FIG. 4 represents an example AO device comprising both a patterned electrode that includes a plurality of different transverse edge positions and a discontinuous (apodized) electrode region oriented in the OPD over a piezoelectric transducer having an AO interaction crystal under the piezoelectric transducer for receiving and propagating a light ray, according to an example embodiment.

As noted above, although disclosed patterned electrodes having different transverse edge positions are distinct in form and function as compared to the patterned electrodes disclosed in the '290 patent, disclosed electrode patterns can optionally be combined with the electrode patterning disclosed in the '290 patent. For example, FIG. 4 represents an example AO device 400 comprising a patterned electrode 410 that includes both disclosed electrically continuous regions 413 having different transverse edge positions and a discontinuous electrode region 412 oriented in the OPD, according to an example embodiment. Example row 417 is shown in FIG. 4. The plurality of rows including row 417 provide different transverse (H) edge positions that span a position range of about 10 percent of the average height ($H_{avg}$) of the electrode 410 in regions 413 as shown in FIG. 4.

Disclosed embodiments include methods of fabricating an electrode for coupling to a piezoelectric transducer of an AO device. The method can include designing an electrode pattern for the electrode that includes a plurality of different transverse edge positions, wherein the plurality of different transverse edge positions span a position range of at least five percent of an average height ($H_{avg}$) of the electrode. An electrode pattern is formed on a face of the piezoelectric transducer using a process comprising lithography.

The plurality of different transverse edge positions can follow a linear function, or a non-linear function, such as a deterministic or non-deterministic function. The designing of the electrode pattern can comprise dividing an initial rectangular pattern having an initial rectangular outline into a plurality of smaller rectangles, and displacing the plurality of smaller rectangles with respect to one another from the initial rectangular outline in a direction perpendicular to an OPD for the AO device so that a main body of the electrode is continuous and no gaps in the electrode pattern are introduced. The plurality of smaller rectangles each can have a width<10 µm. In one embodiment the displacing comprises random displacing.

Having disclosed patterned electrodes including regions having different transverse edge positions and a discontinuous electrode region oriented in the OPD (such as disclosed in the '290 patent) allows AO devices such as AO device 400 to (i) remove side lobes to improve spectral purity and ii) improve the uniformity of the near field acoustic intensity as a function of the transverse position under the transducer. A significant improvement in near field acoustic intensity as a function of the transverse position under the transducer is demonstrated in the scanned image obtained from AO device 400 that is described below relative to FIG. 6B.

Applied to AOTFs, the performance of AOTFs in an optical imaging system can be improved by disclosed embodiments. In one particular AOTF embodiment a "hyperspectral imager" or "multispectral imager" is provided where the AOTF is the element used to select each wavelength band to be imaged in turn. As noted above, when AOTFs are used in an afocal system, where the AOTF is placed in a position where it receives substantially collimated rays, an aberration peculiar to the AO interaction called acousto-optic blur is known to occur. The effect of this is similar to motion blurring, in that the image becomes blurred or fuzzy in one direction only, this direction coincides with the plane of diffraction in the AOTF.

As noted above, for some applications acousto-optic blur is undesirable, and the "telecentric-confocal" configuration which involves the formation of an intermediate focus inside the AOTF has been used to reduce blur. However, in practice, forming the intermediate image inside the AOTF causes the "acoustic near field artifacts" to be very visible, and a compromise is usually taken where the image is formed near to the AOTF, so as to partially defocus the artifacts and render them less obvious. However, the blur starts to increase the further the focus is from the ideal position inside the AOTF.

Figure 5:
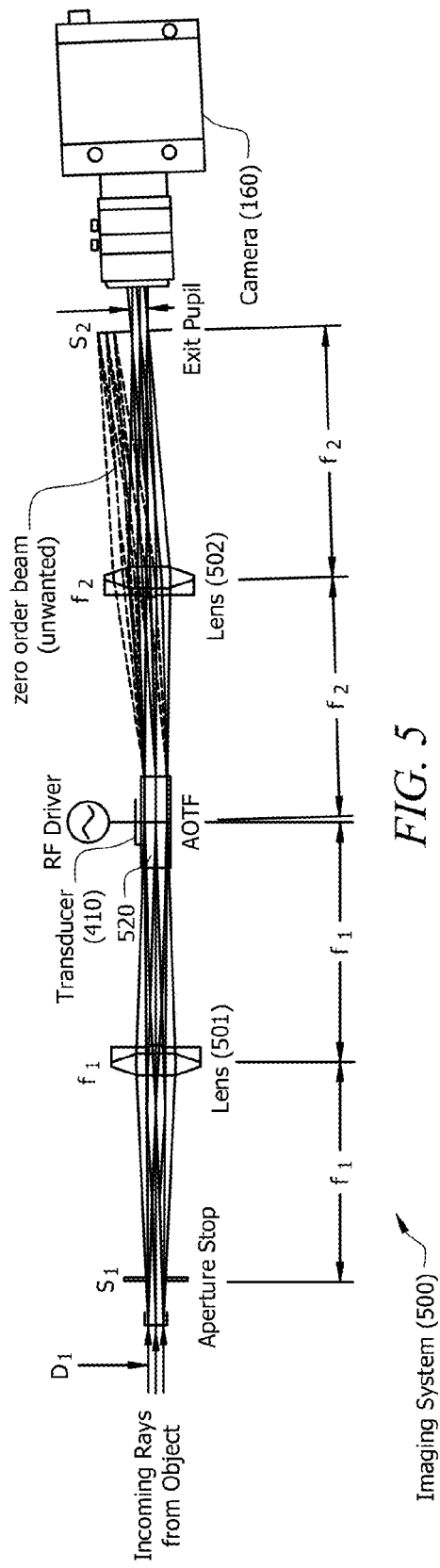
FIG. 5 is a schematic diagram of a telecentric-confocal AOTF-based imaging system that includes an AOTF having an example patterned electrode that includes a plurality of different transverse edge positions, according to an example embodiment.

FIG. 5 is a schematic diagram of a telecentric-confocal AOTF-based imaging system 500 that includes an AOTF 520 having the example patterned electrode 410 shown in FIG. 4 that includes a plurality of different transverse edge positions, according to an example embodiment. Refraction at the input and exit surfaces of the AOTF 520 is ignored in FIG. 5 for simplicity.

The term "telecentric" refers in this case to an aperture stop positioned at the input ($S_1$) and a beam stop ($S_2$) positioned at the output of the system 500 identified as an "exit pupil" at a distance from their respective lenses 101 and 102 equal to the focal lengths $f_1$ and $f_2$ associated with their respective lenses.

Stops S₁ and S₂ are shown at conjugate positions (i.e., so that the image of the aperture stop S₁ is formed at the beam stop S₂).

The aperture stop S₁ ensures that the optical setup is telecentric for the object space, so that the chief ray of each ray pencil is incident on the AOTF 520 thereon at normal incidence, or at least at the same angle. The position of the beam stop S₂ at the front focal length $f_2$ of lens 102 efficiently blocks the unwanted zero order unfiltered light transmitted by the AOTF 520 and to ensure telecentricity in the image space. This is the light that passes straight through the AOTF 520 because it contains wavelengths outside the bandwidth of the AOTF 520. Since the zero-order beam is generally far brighter than the wanted filtered beam, removing it efficiently is important. System 500 also includes a photodetector, such as the camera 160 shown.

As evidenced by data described in the Examples section below relative to FIGS. 6A and 6B, disclosed embodiments have been found to provide a distinct improvement in the images obtained in telecentric-confocal AOTF-based imaging systems (e.g., telecentric-confocal AOTF-based imaging system 500 shown in FIG. 5) through reduction in acoustic near field artifacts. Such embodiments avoid the need for conventional defocusing in the telecentric-confocal configuration to make image artifacts appear less visible, and thus can benefit AOTF-based imaging systems by solving the conventional image blurring problem. Moreover, disclosed embodiments can also benefit a variety of other AO devices, such as AOMs, AOBDs, BCs, AOFSs or AOCs.

EXAMPLES

Disclosed embodiments are further illustrated by the following specific Examples, which should not be construed as limiting the scope or content of this Disclosure in any way.

Figure 6A:
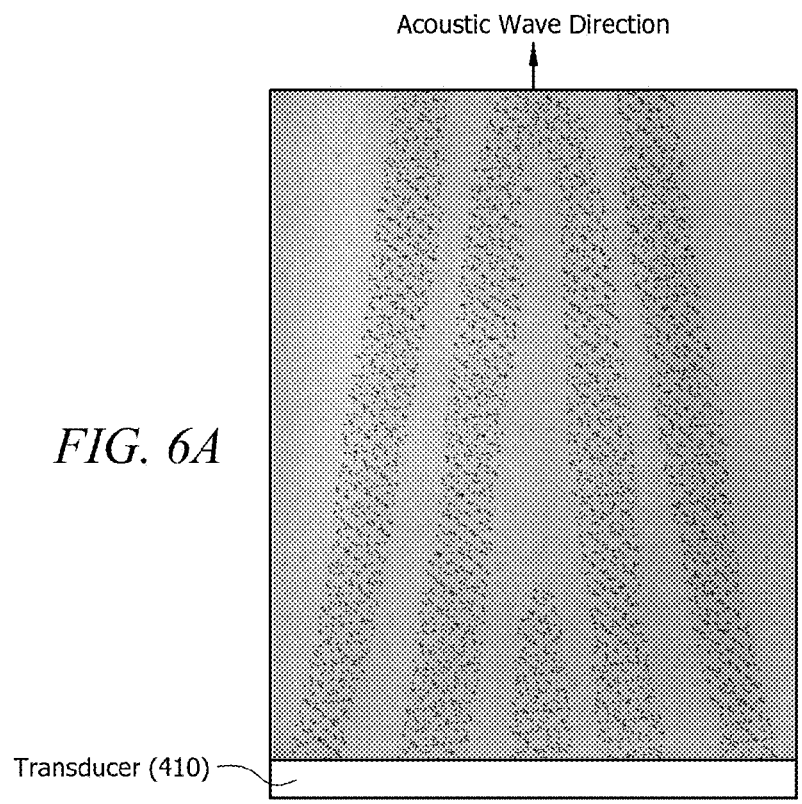
FIG. 6A shows a scanned image that represents experimental results obtained from a control telecentric-confocal system arrangement comprising an AOTF having a patterned electrode that is apodized in the OPD but lacks a plurality of different transverse edge positions which shows pronounced dark bands which represent image blurring.

FIG. 6A shows a scanned image that represents experimental results obtained from a control telecentric-confocal AOTF-based imaging system based on imaging system 500 shown in FIG. 5, modified to have an apodized transducer electrode based on electrodes disclosed in '290 patent having discontinuous electrode regions 412 oriented in the OPD, but lacking disclosed regions 413 having different transverse edge positions. In FIGS. 6A and 6B (described below), the transducer used is represented at the bottom of the FIG. to indicate relative location, and the acoustic wave direction is shown moving from bottom to top of these FIGs. The experiment was performed using experimental parameters including an acoustic wavelength of the order of 10 μm. A breadboard was used to integrate the AOTF as part of a telecentric-confocal hyperspectral imaging system breadboard. A 1 Megapixel, 12-bit CCD camera was used to record the image, and the wavelength of the light was at 780 nm. FIG. 6A evidences several pronounced dark bands that represent image blurring.

Figure 6B:
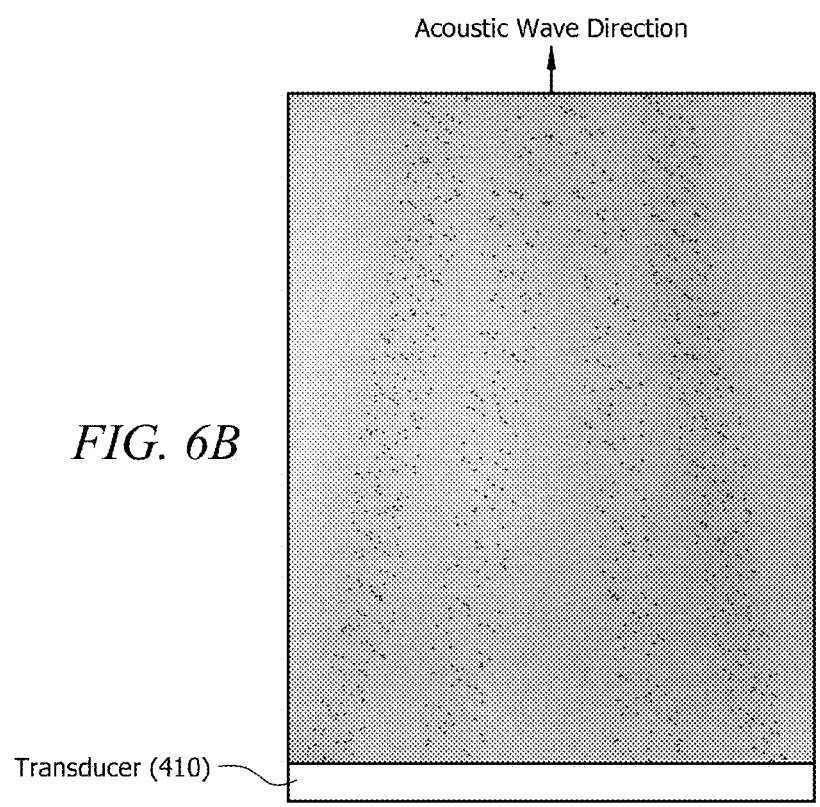
FIG. 6B a scanned image that represents experimental results obtained from an example telecentric-confocal system arrangement comprising an AOTF having an example patterned electrode including both apodization in the OPD and plurality of different transverse edge positions that span ten percent of $H_{avg}$, where fewer dark bands are shown as compared to the scanned image shown in FIG. 6A which evidences a distinct improvement in image quality.

FIG. 6B is a scanned image that represents experimental results obtained from a telecentric-confocal AOTF-based imaging system based on imaging system 500 shown in FIG. 5 including the patterned electrode 410 depicted in FIG. 4 having the same apodization in the OPD as the electrode/transducer described relative to FIG. 6A together with a plurality of different transverse edge positions that span a position range of 10 percent of the average height ($H_{avg}$) of the electrode 410. The experimental parameters used were the same as described above including operation at an acoustic wavelength of 10 μm and wavelength of the light at 780 nm. The reduction in intensity of the dark bands in the scanned image shown in FIG. 6B as compared to the scanned image shown in FIG. 6A evidences a significant reduction in the appearance of artifacts that represents a distinct improvement in the image obtained. Such improvements enable avoiding the need for conventional defocusing in the telecentric-confocal configuration to make the image artifacts appear less visible, and thus can benefit AOTF-based imaging systems by solving the conventional image blurring problem.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I claim:

1. An acousto-optic (AO) device, comprising:
    an AO interaction crystal for receiving and propagating a light ray along an optical propagation direction (OPD);
    a piezoelectric transducer on at least one surface of said AO interaction crystal for receiving an electrical signal and emitting an acoustic wave into said AO interaction crystal, and
    an electrode on said piezoelectric transducer for coupling said electrical signal to said piezoelectric transducer,
    wherein said electrode is a patterned electrode that includes a plurality of different transverse edge positions,
    wherein said plurality of different transverse edge positions span a position range of at least five percent of an average height ($H_{avg}$) of said electrode, and
    wherein said plurality of different transverse edge positions follow a non-linear function.

2. The AO device of claim 1, wherein said non-linear function comprises a pre-defined non-deterministic function.

3. The AO device of claim 2, wherein said non-deterministic function comprises a Gaussian random variable.

4. The AO device of claim 1, wherein said patterned electrode in said OPD further includes:
    an electrically continuous region proximate to its center and
    a discontinuous region, comprising:
        a plurality of spaced apart features oriented in said ODP that are electrically connected to said continuous region,
        wherein feature sizes of said features are sufficiently small to provide a fine structure far field condition for said acoustic wave in said AO interaction crystal underlying said discontinuous region beginning <10 mm measured from an interface between said piezoelectric transducer and said AO interaction crystal,
wherein said plurality of spaced apart features enhance suppression of out-of-band light.

5. The AO device of claim 1, wherein said patterned electrode is representable by a plurality of electrically contiguous rectangles oriented along a transverse direction.

6. The AO device of claim 1, wherein a peak-to-peak length-averaged in length-averaged average acoustic intensity at a midway position in said AO interaction crystal between a center of said patterned electrode and its edges and transverse positions proximate thereto are reduced by at least 50 percent as compared to a variance in said average acoustic intensity for a reference rectangular electrode having an area equal to said patterned electrode.

7. The AO device of claim 1, wherein said AO device comprises an Acousto-Optic Modulator (AOM), Acousto-Optic Beam Deflector (AOBD), Bragg Cell (BC), Acousto-Optic Tunable Filter (AOTF), Acousto-Optic Frequency Shifter (AOFS) or an Acousto-Optic Correlator (AOC).

8. A method of fabricating an electrode for coupling to a piezoelectric transducer of an acousto-optic (AO) device, comprising:
designing an electrode pattern for said electrode that includes a plurality of different transverse edge positions, wherein said plurality of different transverse edge positions span a position range of at least five percent of an average height ($H_{aag}$) of said electrode, wherein said plurality of different transverse edge positions follow a non-linear function,
forming a metal layer on a face of said piezoelectric transducer,
patterning said metal layer using a process comprising photolithography, said process comprising photolithography including:
using light to transfer said electrode pattern from a photomask to a photoresist on said face of said piezoelectric transducer, and
removing an exposed portion of said metal layer to form said electrode pattern.

9. The method of claim 8, wherein said non-linear function comprises a non-deterministic function.

10. The method of claim 8, wherein said designing said electrode pattern comprises dividing an initial rectangular pattern having an initial rectangular outline into a plurality of smaller rectangles, and
displacing said plurality of smaller rectangles with respect to one another from said initial rectangular outline in a direction perpendicular to an optical propagation direction (OPD) for said AO device so that a main body of said electrode is continuous and no gaps in said electrode pattern are introduced.

11. The method of claim 10, wherein said displacing comprises random displacing.

12. A telecentric-confocal AOTF-based imaging system, comprising:
an acousto-optic tunable filter (AOTF), comprising:
an AO interaction crystal for receiving and propagating a light ray along an optical propagation direction (OPD);
a piezoelectric transducer on at least one surface of said AO interaction crystal for receiving an electrical signal and emitting an acoustic wave into said AO interaction crystal, and
an electrode on said piezoelectric transducer for coupling said electrical signal to said piezoelectric transducer,
wherein said electrode is a patterned electrode that includes a plurality of different transverse edge positions, and
wherein said plurality of different transverse edge positions span a position range of at least five percent of an average height ($H_{avg}$) of said electrode,
a first lens on an input side of said AOTF having a focal length $f_1$ and a second lens on an output side of said AOTF having a focal length $f_2$;
an aperture stop positioned at an input ($S_1$) and a beam stop ($S_2$) positioned at an output of said system, with said $S_1$ positioned at a distance from said first lens equal to said $f_1$ and said $S_2$ positioned at a distance from said second lens equal to said $f_2$, and
a photodetector positioned to detect a beam transmitted through said beam stop.

13. The system of claim 12, wherein said patterned electrode in said OPD further includes:
a continuous region proximate to its center and
a discontinuous region, comprising:
a plurality of spaced apart features oriented in said ODP that are electrically connected to said continuous region,
wherein feature sizes of said features are sufficiently small to provide a fine structure far field condition for said acoustic wave in said AO interaction crystal underlying said discontinuous region beginning <10 mm measured from an interface between said piezoelectric transducer and said AO interaction crystal,
wherein said plurality of spaced apart features enhance suppression of out-of-band light.

14. The system of claim 12, wherein said plurality of different transverse edge positions follow a non-linear function.

* * * * *